US010070704B2

(12) United States Patent
Baldauf et al.

(10) Patent No.: US 10,070,704 B2
(45) Date of Patent: Sep. 11, 2018

(54) LOOP-FORMING CLOSURE ELEMENT FOR HOOK-AND-LOOP FASTENERS AND METHOD FOR THE PRODUCTION OF A CLOSURE ELEMENT

(71) Applicant: MONDI GRONAU GMBH, Gronau (DE)

(72) Inventors: Georg Baldauf, Laer (DE); Dieter Homoelle, Ochtrup (DE)

(73) Assignee: Mondi Gronau GmbH, Gronau (DE)

( * ) Notice: Subject to any disclaimer, the term of this patent is extended or adjusted under 35 U.S.C. 154(b) by 0 days.

(21) Appl. No.: 14/506,797

(22) Filed: Oct. 6, 2014

(65) Prior Publication Data

US 2015/0107063 A1    Apr. 23, 2015

(30) Foreign Application Priority Data

Oct. 18, 2013   (EP) .................................... 13189354

(51) Int. Cl.
| | |
|---|---|
| *A44B 18/00* | (2006.01) |
| *B32B 5/06* | (2006.01) |
| *B32B 5/26* | (2006.01) |
| *B32B 3/30* | (2006.01) |
| *D04H 1/495* | (2012.01) |
| *D04H 5/03* | (2012.01) |
| *B32B 5/02* | (2006.01) |

(Continued)

(52) U.S. Cl.
CPC ............ *A44B 18/008* (2013.01); *B32B 3/266* (2013.01); *B32B 3/30* (2013.01); *B32B 5/022* (2013.01); *B32B 5/06* (2013.01); *B32B 5/26* (2013.01); *B32B 7/12* (2013.01); *D04H 1/495* (2013.01); *D04H 5/03* (2013.01); *A41B 2400/52* (2013.01); *A44B 18/0011* (2013.01); *B32B 2262/0253* (2013.01); *B32B 2262/0276* (2013.01); *B32B 2307/542* (2013.01); *B32B 2555/02* (2013.01); *Y10T 24/2767* (2015.01)

(58) Field of Classification Search
CPC ............ A41B 2400/52; A44B 18/0011; A44B 18/008; B32B 2262/0253; B32B 2262/0276; B32B 2307/542; B32B 2555/02; B32B 3/266; B32B 3/30; B32B 5/022; B32B 5/06; B32B 5/26; B32B 7/12; D04H 1/495; D04H 5/03; Y10T 24/2767

See application file for complete search history.

(56) References Cited

U.S. PATENT DOCUMENTS 3,271,216 A * 9/1966 Koller .................... D04H 11/04
156/181
5,614,281 A * 3/1997 Jackson ............. A44B 18/0011
24/450

(Continued)

FOREIGN PATENT DOCUMENTS

DE    10 2004 053 469    5/2006
DE    20 2004 021 382    12/2007

(Continued)

*Primary Examiner* — David M Upchurch
(74) *Attorney, Agent, or Firm* — Collard & Roe, P.C.

(57) ABSTRACT

A loop-forming closure element for hook-and-loop fasteners embodies an embossed nonwoven material having continuous fibers of a spun bonded fabric and carded staple fibers. The continuous fibers and the staple fibers are intertwined and form a common nonwoven material layer as a fiber blend.

10 Claims, 6 Drawing Sheets

(51) Int. Cl.
*B32B 7/12* (2006.01)
*B32B 3/26* (2006.01)

(56) References Cited

U.S. PATENT DOCUMENTS

| | | | | |
|---|---|---|---|---|
| 5,669,900 A | * | 9/1997 | Bullwinkel | A24D 3/0237 128/DIG. 15 |
| 5,773,120 A | | 6/1998 | Deka et al. | |
| 5,888,607 A | * | 3/1999 | Seth | A44B 18/0011 428/101 |
| 6,162,522 A | * | 12/2000 | Deka | A44B 18/0011 24/448 |
| 6,192,556 B1 | | 2/2001 | Kikko et al. | |
| 6,489,004 B1 | * | 12/2002 | Martin | A44B 18/008 24/451 |
| 6,642,429 B1 | * | 11/2003 | Carter | A61F 13/511 604/367 |
| 6,740,385 B2 | * | 5/2004 | Gardner | B32B 5/06 28/107 |
| 7,465,366 B2 | * | 12/2008 | Provost | A44B 18/0011 156/148 |
| 7,544,628 B2 | | 6/2009 | Stupperich et al. | |
| 7,547,469 B2 | * | 6/2009 | Provost | A44B 18/0011 428/88 |
| 2002/0019206 A1 | * | 2/2002 | Deka | A44B 18/0011 451/526 |
| 2003/0232170 A1 | | 12/2003 | Gillette et al. | |
| 2004/0072491 A1 | | 4/2004 | Gillette et al. | |
| 2004/0163221 A1 | * | 8/2004 | Shepard | A44B 18/0011 24/452 |
| 2006/0148359 A1 | * | 7/2006 | Van Gompel | D04H 3/163 442/328 |
| 2006/0217022 A1 | | 9/2006 | Gillette et al. | |
| 2007/0178273 A1 | * | 8/2007 | Provost | A44B 18/0011 428/89 |
| 2008/0260989 A1 | * | 10/2008 | Lester | A44B 18/0011 428/100 |
| 2008/0305704 A1 | * | 12/2008 | Provost | A44B 18/0011 442/360 |
| 2013/0052403 A1 | * | 2/2013 | Barker | A44B 18/0003 428/99 |

FOREIGN PATENT DOCUMENTS

| | | |
|---|---|---|
| EP | 0 937 420 | 8/1999 |
| EP | 0 963 472 | 12/1999 |
| WO | WO 03/105621 | 12/2003 |

* cited by examiner

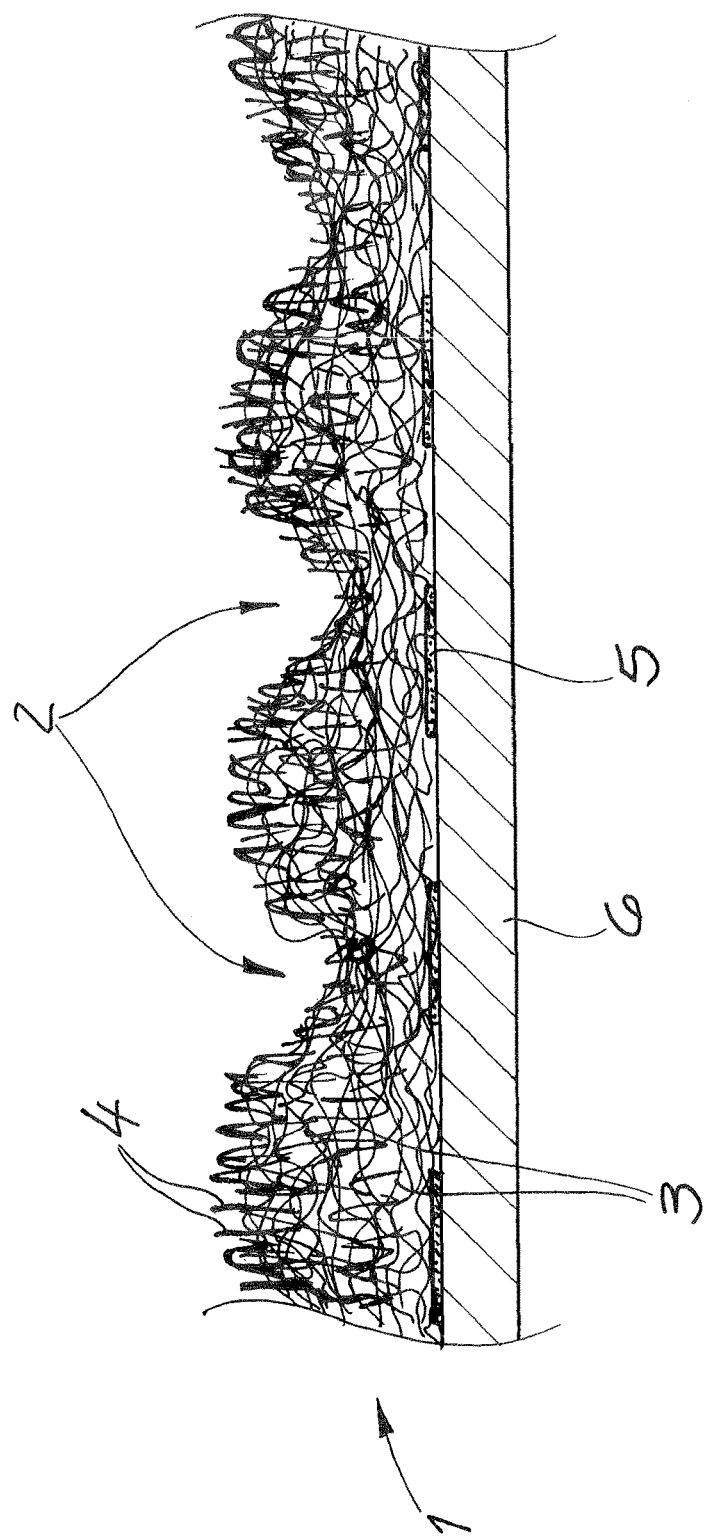

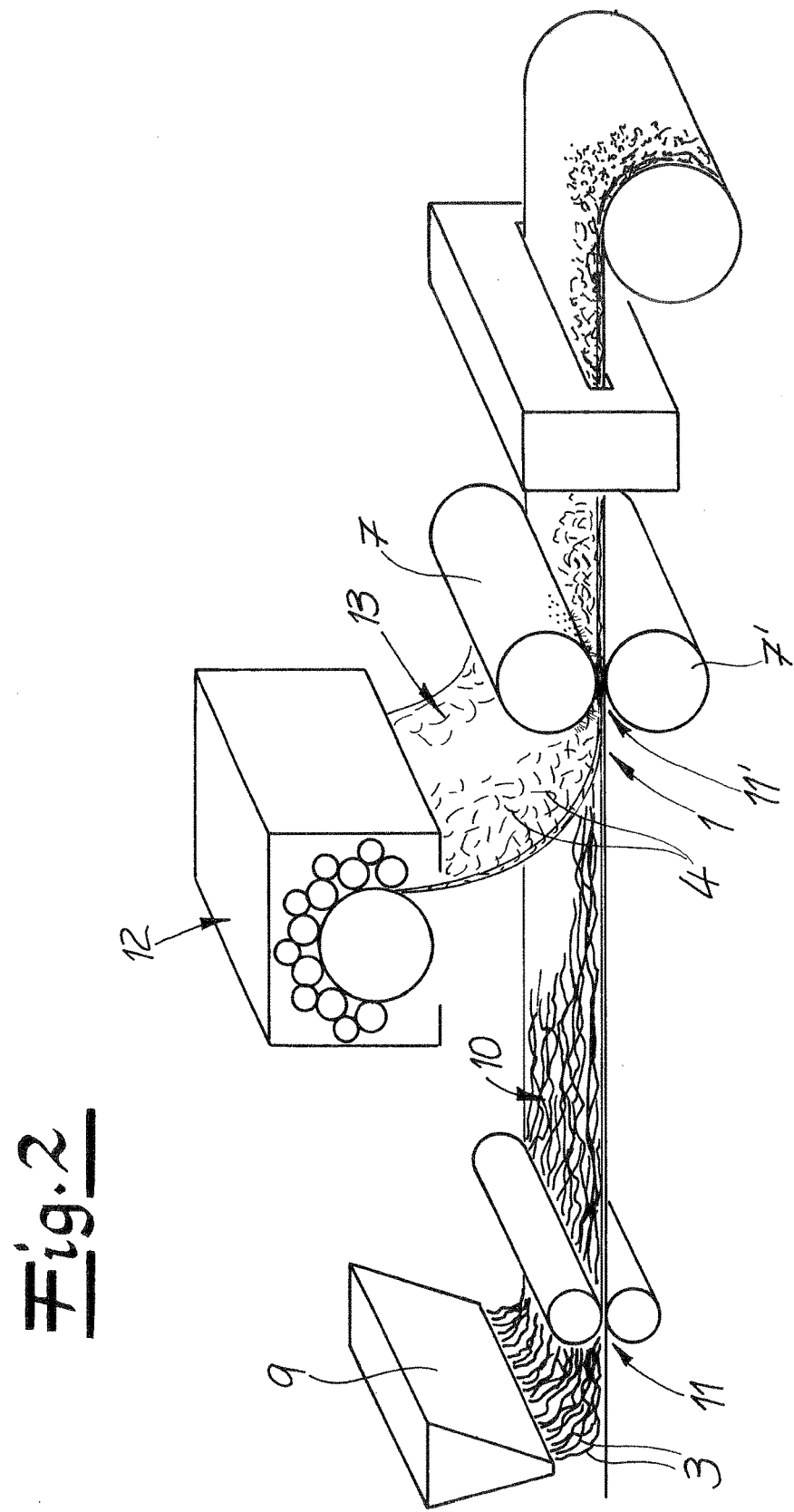

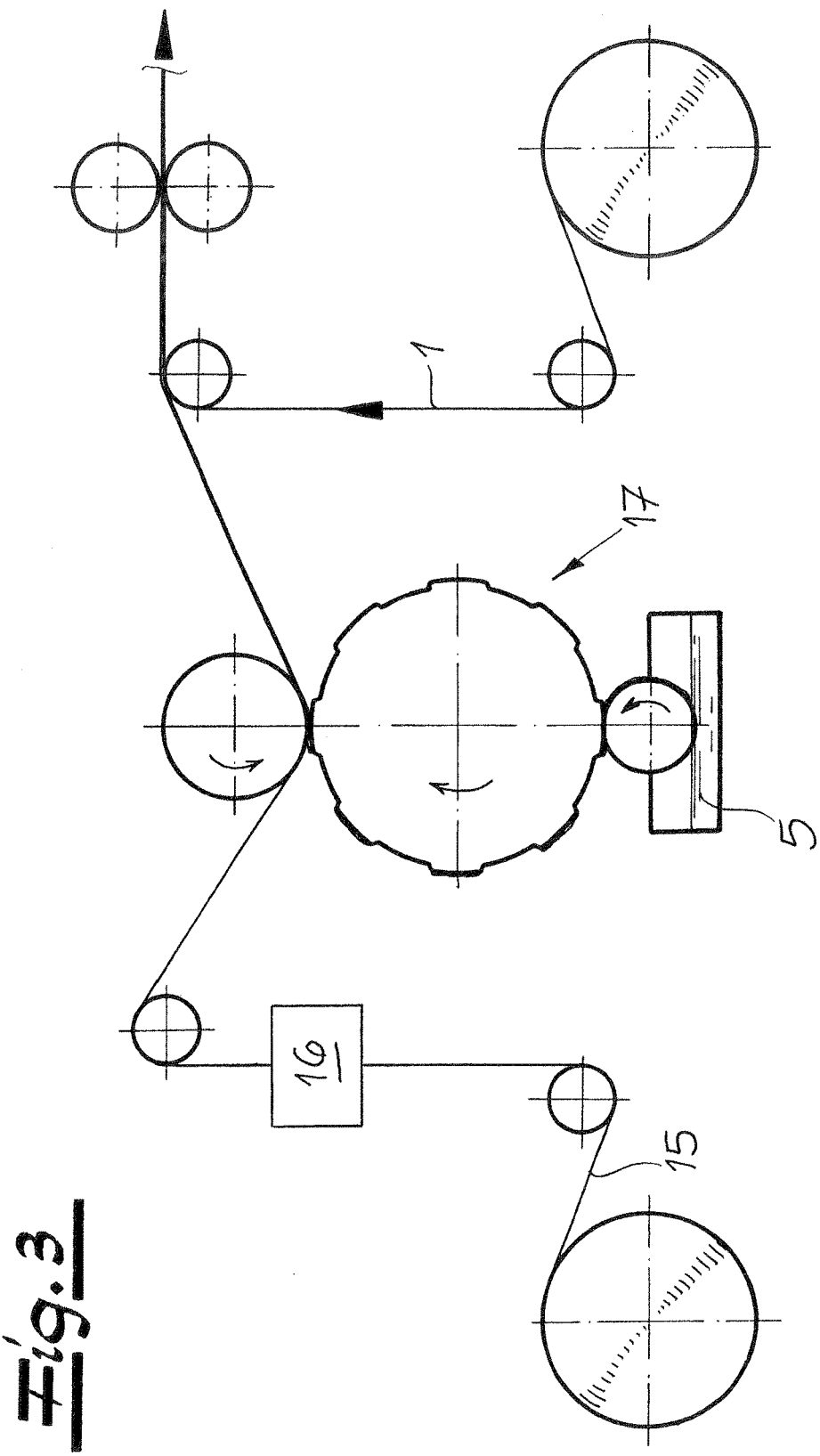

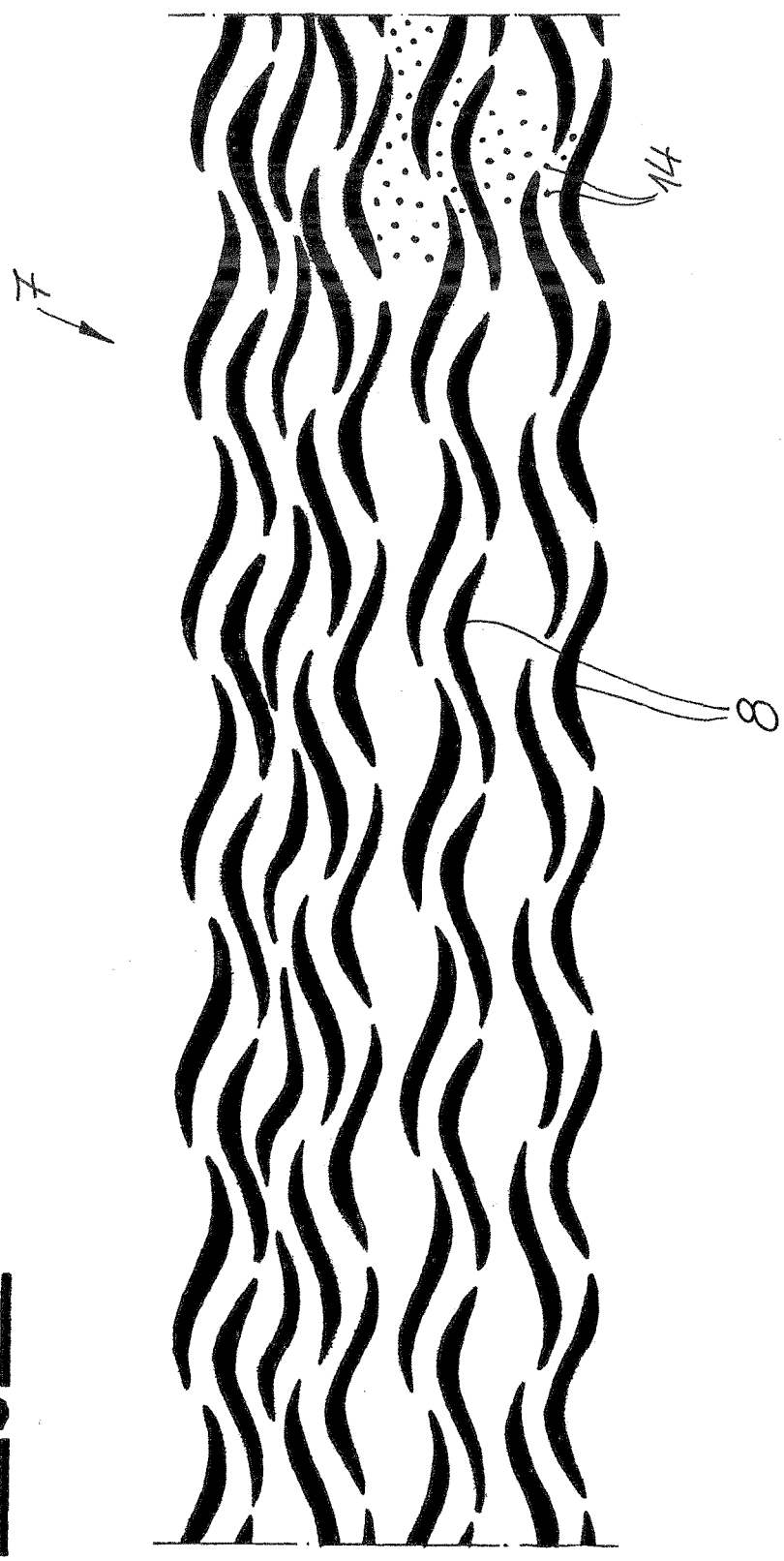

LOOP-FORMING CLOSURE ELEMENT FOR HOOK-AND-LOOP FASTENERS AND METHOD FOR THE PRODUCTION OF A CLOSURE ELEMENT

CROSS-REFERENCE TO RELATED APPLICATION

The invention described and claimed hereinbelow is also described in German Patent Application DE 10 2013 189 354.7, filed on Oct. 18, 2013. The German Patent Application, the subject matters of which is incorporated herein by reference, provides the basis for a claim of priority of invention under 35 U.S.C. 119(a)-(d).

BACKGROUND OF THE INVENTION

The invention relates to a loop-forming closure element for hook-and-loop fasteners, comprising an embossed nonwoven material having continuous fibers of a spun bonded fabric and carded staple fibers.

For use on diapers, loop-forming closure elements are attached on the front waist region of the diapers in the form of strips. The hook-and-loop fastener is completed by closure strips, which are fastened on the sides of the diapers and have gripping hooks on the free ends thereof. Since the gripping hooks come to lie on the loop-forming closure element during use and bring about an interlocking connection there, the loop-forming closure element is also referred to as a "landing zone".

Hook-and-loop fasteners are repeatedly opened and closed without this impairing the functionality of the closure. In contrast to adhesive closures, hook-and-loop fasteners are insensitive to contact with skin creams or powder.

A plurality of requirements are placed on hook-and-loop fasteners on disposable products. First of all, it should be possible to produce the loop-forming closure element of the hook-and-loop fastener as simply as possible and using the least amount of material possible, for reasons of cost. Furthermore, the loop-forming closure element must ensure an adequate interconnection with gripping hooks of the associated closure strip. Finally, the closure element should also allow an attractive design to be obtained and should have a pleasant feel.

Document DE 20 2004 021 382 U1 makes known a loop-forming closure element, which has a knitted fabric on a carrier film, wherein the knitted fabric and the carrier film are interconnected by an adhesive pattern. The knitted fabric can have a mass per unit area of 18 g/m², for example, which results in a lightweight, open structure overall, while a decorative impression on the carrier film remains visible through the knitted fabric. By applying adhesive in a pattern, it is ensured that the loops do not stick to the adhesive-free regions and remain freely accessible for gripping hooks, wherein gripping hooks can even engage in the basic structure of the knitted fabric. On the bonded sections, however, as much adhesive is provided that is necessary to securely fasten the knitted fabric. The fact that individual loops also become bound into the adhesive there is not unacceptable.

Loop-forming closure elements with incorporated loops have proven effective in practical applications, but the feel thereof is perceived as somewhat unpleasant. Even if the loop-forming closure element comes into direct contact with a user only in exceptional cases, the "skin friendliness" of the material still needs improvement for some applications.

In addition to closure elements having incorporated loops, nonwoven materials also are known, which form loops that are suitable for connection with gripping hooks.

Document EP 0 963 472 B1 makes known a loop-forming nonwoven material for hook-and-loop fasteners, wherein bicomponent fibers are used to produce a sufficiently solid structure. In order to obtain a plurality of bonds between fibers, a polymer component is fused onto the bicomponent fibers in the presence of hot air. The manufacturing process is complex overall.

Document WO 03/105621 A1 makes known a spunlaced nonwoven as the loop-forming closure element, wherein the loops are formed by water-jet entangling. The nonwoven material is embossed for decorative purposes. The surface texture and the gripping effect of the known nonwoven material require further improvement.

A loop-forming closure element also is known from DE 10 2004 053 469 A1, wherein a card web, i.e., a layer of carded staple fibers, is disposed on a spun bonded fabric and the thusly formed nonwoven material is embossed. The card web and the spun bonded fabric are provided for different purposes. While the carded staple fibers are provided for connection with gripping hooks, the continuous fibers of the spun bonded fabric provide high stability and attachment on a carrier layer.

Document EP 0 937 420 A2 makes known a loop-forming closure element for hook-and-loop fasteners, which can contain a nonwoven material having continuous fibers of a spun bonded fabric and carded staple fibers. A mechanical needle punching for forming loops is described.

SUMMARY OF THE INVENTION

The present invention overcomes the shortcomings of known arts, such as those mentioned above.

To that end, the present invention provides a loop-forming closure element for hook-and-loop fasteners comprising an embossed nonwoven material to realize good gripping effect, and a particularly soft surface. The invention also provides a method for the production of such a closure element.

Proceeding from a loop-forming closure element having the initially described features, the invention provides for intertwining the continuous fibers and the staple fibers and jointly forming a layer of nonwoven material comprising a fiber blend.

According to the invention, the properties of the continuous fibers and of the staple fibers are therefore combined with one another in a particularly advantageous manner. The continuous fibers form a continuous, stabilizing structure, which enables tensile forces to be transferred within the material. The staple fibers, however, which are also referred to as short-staple fibers, produce a particularly soft and fleeced structure, wherein at least a few staple fibers protrude on both sides of the nonwoven material layer.

The intertwining and blending of the continuous fibers and the staple fibers initially effectively anchor the staple fibers in the nonwoven material. The continuous fibers simultaneously form a basic structure into which the staple fibers are incorporated.

By blending and intertwining the fibers with one another, which is carried out, for example, by acting upon the fibers with water jets, the staple fibers as well as the continuous fibers can form loops on a surface of the nonwoven material, which are suitable for receiving gripping hooks.

According to the invention, the entire nonwoven material is embossed. The embossing initially increases the stability and strength of the nonwoven material. The staple fibers and the continuous fibers are bulked particularly intensively by water jets in the space between the embossed regions, thereby improving the gripping effect. The embossing also enlarges the surface area of the nonwoven material, wherein gripping hooks can engage deeply into the nonwoven material specifically on the edge of the embossing.

In an embodiment, the embossed nonwoven material is formed entirely of the continuous fibers and the staple fibers, and therefore the nonwoven material then comprises only one nonwoven material layer made of a fiber blend.

In the production of the loop-forming closure element, the spun bonded fabric and the carded staple fibers are usually supplied as separate layers and are then intertwined and blended with one another, by water jets, for example.

In such a procedure, a completely homogeneous mixture is usually not obtained, and therefore the proportion of continuous fibers to the proportion of staple fibers changes across the thickness of the nonwoven material layer. Accordingly, the intertwining and blending at least take place such that at least a few of the short staple fibers protrude from both sides of the nonwoven material layer. The proportion of staple fibers will usually be greater on the side of the nonwoven material on which the staple fibers would have been originally supplied. After the blending and intertwining by water jets, this side is then also softer and is preferably provided as the exposed side of the closure element for the connection with gripping hooks.

The nonwoven material layer is configured such that the nonwoven material layer has sufficient tensile strength and a sufficient number of free loops when used with typical gripping hooks.

To minimize cost, the invention is manufactured in a way that realizes the lowest possible mass per unit area, wherein a decorative impression also is provided underneath the nonwoven material, which is intended to be visible through the nonwoven material layer. Proceeding therefrom, the mass per unit area of the nonwoven material layer is preferably between 20 $g/m^2$ and 50 $g/m^2$ (grams per square meter). Nonwoven materials having the mass per unit area indicated are also referred to as lofty nonwoven fabrics.

The nonwoven material is laminated with a carrier film so that the closure element is easily attached on a hygienic product such as a diaper or the like and is provided with a decorative covering. The lamination can take the form of an adhesive pattern having bonded sections and adhesive-free areas. Suitable adhesive patterns are known from DE 20 2004 021 382 U1. A simple film made of polyolefin, in particular, is provided as the carrier film.

The carrier film preferably has a thickness between 10 and 40 μm, wherein, for example, a monofilm made of polyethylene is used, which is provided with the nonwoven material with an impression before lamination is implemented. A single-component PUR laminating adhesive also is provided as the adhesive.

As described above, the impressions can make a contribution to improved strength and an improved gripping effect. It must be taken into account, however, that the embossed regions are not available or are available only to a limited extent for the connection with gripping hooks. Proceeding therefrom, the surface portion of the impressions is preferably between 5% and 20%.

The density of the nonwoven material is, for example, between 0.04 and 0.1 $g/cm^3$. The continuous fibers are usually deposited randomly and can have a fineness of 0.8 to 1.8 dtex, preferably of 1.0 to 1.2 dtex.

The staple fibers are curled and can have a fineness, for example, of 2.2 to 15 dtex, preferably of 4 to 10 dtex.

Basically, it also is possible to specify two different types of staple fibers having different levels of fineness. In particular, a second type is provided, which has a lesser fineness of 1.2 to 2.1 dtex, for example. The ratio of the first type to the second type is preferably greater than 1:4.

Different embossing patterns are basically suitable. In addition to punctiform and latticed impressions, the nonwoven material also is provided with linear or wavy impressions in particular. In the case of an interrupted wave shape, a visually pleasing appearance also results, which also is matched to an impression located thereunder.

In order to keep production costs low overall, the continuous fibers are preferably formed of polyolefin, wherein polypropylene, in particular, is suitable for use as the material for the continuous fibers. The staple fibers also are formed of polyolefin, in particular, polypropylene (PP). This makes it possible to provide a homogeneous nonwoven material. In addition, a polyester, in particular, polyethylene terephthalate (PET), also is suitable for use as the polymer material for the staple fibers.

The impressions are preferably formed on the side on which the staple fibers are initially placed during production and which is preferably also provided for the connection with the gripping hooks.

The invention also provides a method for the production of the above-described closure element. In the method, a spun bonded fabric is formed by extruding and depositing continuous fibers, wherein a layer of carded staple fibers is subsequently placed onto the spun bonded fabric such that the staple fibers are located on a first side of the thusly formed nonwoven material. The continuous fibers and staple fibers of the nonwoven material are subsequently acted upon with water jets and are thereby blended with one another and intertwined and whereby the nonwoven material is cold embossed.

In the production process, the embossing and the acting upon with water jets are preferably combined with one another. The spun bonded fabric and the layer of carded staple fibers are fed to a roller gap between two rollers for embossing and to be acted upon by water jets. At least one of the rollers has an embossing structure and a perforation having a plurality of openings for producing water jets. While the nonwoven material is retained and fixed in position in the roller gap on raised areas of the embossing structure, the remaining areas are free, thereby allowing the fibers to intimately blend with one another and bulk up there.

In particular, the roller comprises a perforation having a plurality of openings for producing the water jets. The openings of the perforation are disposed between the raised areas of the embossing structure.

A plurality of roller pairs preferably are disposed one behind the other in order to obtain a good intertwining of the fibers.

As described above, after the cold embossing and after having been acted upon with water jets, the nonwoven material is laminated by adhesive onto a carrier film, on which a decoration was previously printed. The lamination with the film preferably takes place on a second side of the nonwoven material, i.e., opposite the first side, on which the layer of staple fibers was previously placed onto the spun bonded fabric.

BRIEF DESCRIPTION OF THE DRAWINGS

Further features and advantages of the invention will become apparent from the description of exemplary embodiments that follows, with reference to the attached figures. Therein:

FIG. 1A shows a loop-forming closure element for hook-and-loop fasteners,

FIG. 2 shows method steps for producing the loop-forming closure element depicted in FIGS. 1A and 1B;

FIG. 3 shows method steps for producing the loop-forming closure element depicted in FIGS. 1A and 1B.

FIG. 4 shows an embossing structure on the surface of a roller used in the method according to FIG. 2.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1B:
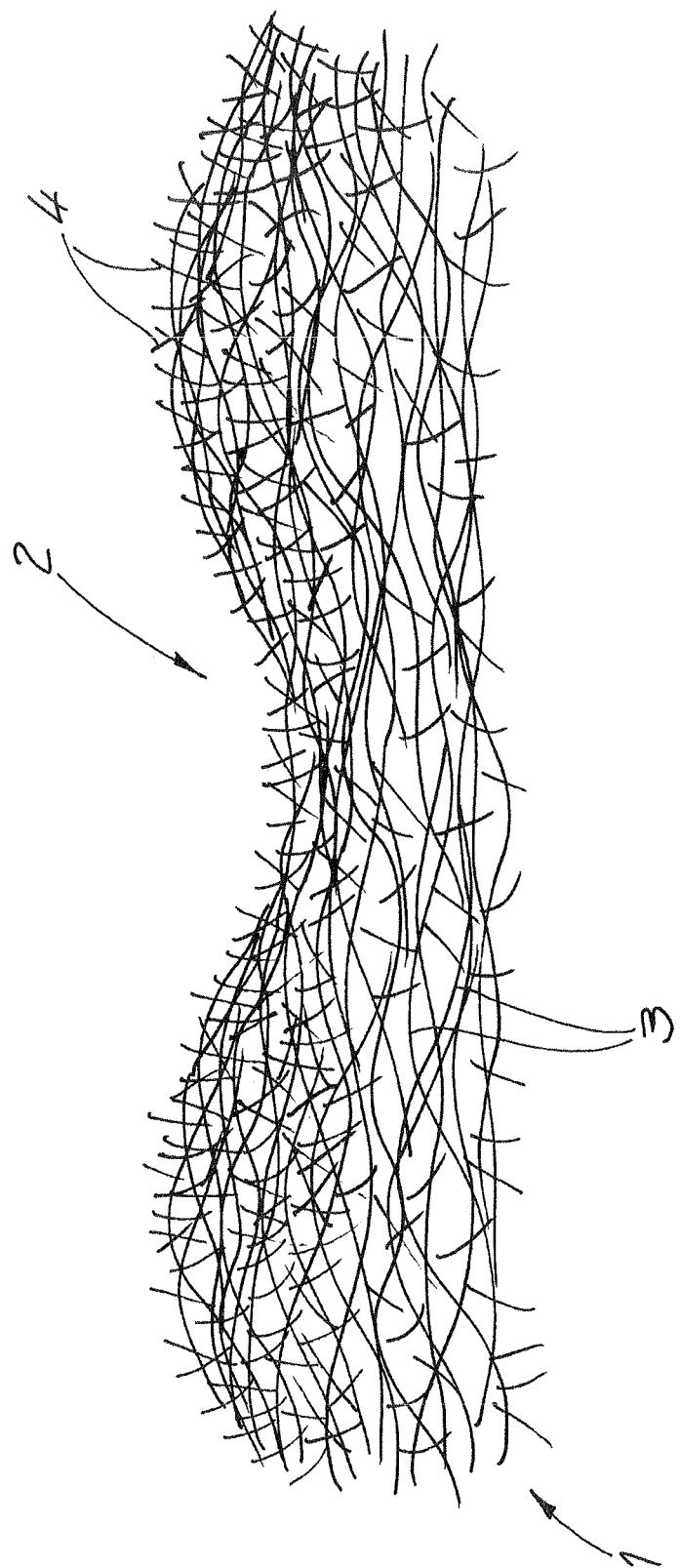
FIG. 1B shows staple fibers protruding from both sides of the nonwoven materials layer of the loop-forming closure element of FIG. 1.

FIG. 1B shows a loop-forming closure element, which forms the female part of a hook-and-loop fastener, wherein loops for connection with gripping hooks of a nonwoven material 1 are formed. The nonwoven material 1 has impressions 2 on a first side and, on one side, is formed of continuous fibers 3 of a spun bonded fabric and carded short-staple fibers in the form of staple fibers 4. The continuous fibers 3 and the staple fibers 4 are intertwined and form a common nonwoven material layer comprising a fiber blend. While the continuous fibers 3 ensure good stability and strength of the nonwoven material 1, the staple fibers 4 provide a particularly soft surface.

As is clear in FIG. 1B, the staple fibers 4 extend across the entire thickness of the nonwoven material 1, although as shown in FIGS. 1A and 1B, the proportion of staple fibers on the first side of the nonwoven material 1 provided with impressions 2 is somewhat higher, for production-related reasons.

The nonwoven material 1 is laminated with a single-layer carrier film 6 by means of adhesive 5.

Between the impressions 2, the continuous fibers 3 and the staple fibers 4 protrude from the first side of the nonwoven materials 1, partially forming loops, and can therefore be used for a connection with gripping hooks. As shown in FIG. 1B, at least a few staple fibers protrude from the other or second side of the nonwoven materials forming nonwoven materials layer 1. An interconnection at the continuous fibers 3 as well as at the staple fibers 4 is possible. Gripping hooks can engage deeply into the nonwoven material 1 specifically at the edges of the impressions 2. In addition, the impressions 2 bring about a stabilization of the nonwoven material 1.

At the impressions 2, the continuous fibers 3 and the staple fibers 4 are deformed without fusing with one another. The mass per unit area of the nonwoven material 1 is preferably between 20 g/m$^2$ and 50 g/m$^2$.

As explained in detail in the following, the impressions 2 are produced using a roller 7 (FIG. 2). The surface structure of the roller 7 provided for the embossing is depicted in FIG. 4. The structure that is shown therefore also corresponds to the embossing structure of the nonwoven material 1 in the top view. It is evident that, in the top view, the impressions 2 are shaped in the form of wavy sections corresponding to the raised areas 8 of the roller. The surface portion of the impressions is typically between 5% and 20%.

The continuous fibers 3 as well as the staple fibers 4 are formed of polyolefin, in particular polypropylene (PP). A polyester, in particular PET, also is a possible alternative material for the staple fibers 4.

FIG. 2 shows the steps for producing the nonwoven material 1. As shown, continuous fibers 3 are first extruded from an extruder 9 and are deposited in order to produce a spun bonded fabric 10. The deposited continuous fibers 3 are guided through a roller gap 11 in an incompletely hardened state and are thereby interconnected to a slight extent.

Next, a carding device 12 produces a layer 13 of carded staple fibers 4 and places the layer onto the spun bonded fabric 10 such that the staple fibers 4 are located on a first side of the thusly formed nonwoven material 1.

Subsequent thereto, the nonwoven material 1, which still has two layers at this point, is fed to a roller gap 11 between two rollers 7, 7', wherein one of the rollers 7 has the embossing structure (according to FIG. 4) and a perforation having a plurality of openings 14 between the raised areas 8 of the embossing structure.

A pressurized liquid is fed to the roller 7 provided with the raised areas 8 in order to produce liquid jets at the openings 14, wherein said liquid jets are referred to as water jets within the scope of the invention, even if water is not fed, but rather an aqueous liquid or another liquid. While the nonwoven material 1 is embossed in the roller gap 11' between the rollers 7, 7', the continuous fibers 3 are blended and intertwined with the staple fibers 4 by the action of water jets. As a result, a nonwoven material layer forms out of the fiber blend, which contains staple fibers 4 and continuous fibers 3 across the thickness thereof. As such, a somewhat greater concentration of the staple fibers 4 is generally expected on the first side of the nonwoven material 1, because the staple fibers were originally placed there.

FIG. 2 also shows that the nonwoven material 1 is dried and then rolled up.

FIG. 3 shows the further processing, wherein a carrier film 15 is supplied and is provided with a decorative impression in a printing unit 16. Subsequently, the adhesive 5 is applied onto the carrier film 15 in a pattern via a roller arrangement 17 before the carrier film 15, comprising the adhesive 5 disposed thereon in a pattern, is laminated with the nonwoven material 1, thereby ultimately resulting in the material depicted in FIG. 1.

Figure 5:
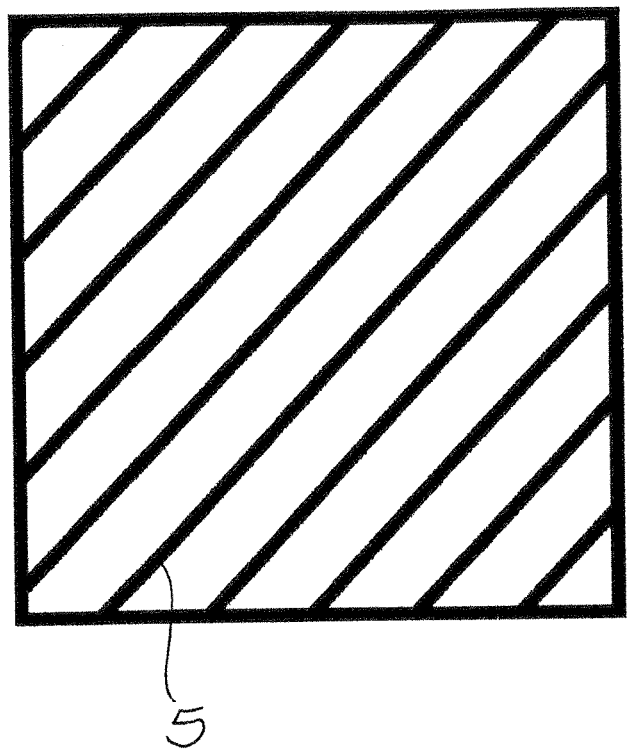
FIG. 5 shows an adhesive pattern for laminating a nonwoven material with a carrier film.

FIG. 5 shows, as an example, a suitable adhesive pattern for connecting the nonwoven material 1 with the carrier film 15. The surface portion of adhesive 5 and, therefore, also the portion of the bonded regions is preferably between 10 and 30%. The amount of adhesive 5 present, on average, over the entire surface is preferably between 1.5 g/m$^2$ and 5 g/m$^2$. The width of the individual webs provided with adhesive are in the range of 1 to 1.5 mm, for example.

Example 1

In an embodiment, a monofilm of polyethylene having a thickness of 14 μm, produced by blown film extrusion, was supplied and provided with a decorative impression on a first side. The PE monofilm formed of a mixture of PE-LLD and PE-HD was then provided with a single-component PUR adhesive having the adhesive pattern according to FIG. 5 and was provided with a nonwoven material 1 having a mass per unit area of 35 g/m². The nonwoven material 1 is formed of continuous fibers 3 and staple fibers 4, each of which comprise polypropylene. The mass per unit area of the adhesive applied for the lamination is 3.0 g/m².

Example 2

While all other parameters remain the same, the mass per unit area of the nonwoven material was increased from 35 g/m² to 40 g/m².

Comparative Example

The carrier film 15 having the above-described configuration was imprinted and then provided with the single-component PUR adhesive having a mass per unit area of 1.8 g/m² having the pattern depicted in FIG. 5. A known knitted fabric made of polyamide having a mass per unit area of 18 g/m² was laminated instead of the nonwoven material 1.

TABLE 1

| | Peel Fmax [N/inch] | | | | | | | | |
|---|---|---|---|---|---|---|---|---|---|
| | 3M CHK 01088 - Hook | | | 3M KN 2570- Hook | | | Binder 445 | | |
| PEEL | Mean | Min | Max | Mean | Min | Max | Mean | Min | Max |
| Example 1 | 1.5 | 0.9 | 2.8 | 3.5 | 1.8 | 4.9 | 7.5 | 5.3 | 11.1 |
| Example 2 | 3.8 | 1.8 | 6.6 | 5.7 | 3.3 | 7.4 | 10.5 | 7.4 | 13.4 |
| Comparative example | 2.8 | 2.1 | 4.9 | 2.5 | 2.0 | 3.7 | 6.3 | 3.3 | 10.0 |

TABLE 2

| | Shear Fmax [N/inch] | | | | | | | | |
|---|---|---|---|---|---|---|---|---|---|
| | 3M CHK 01088 - Hook | | | 3M KN 2570- Hook | | | Binder 445 | | |
| SHEAR | Mean | Min | Max | Mean | Min | Max | Mean | Min | Max |
| Example 1 | 41.6 | 26.7 | 51.5 | 40.0 | 31.1 | 53.2 | 32.9 | 12.4 | 41.9 |
| Example 2 | 39.5 | 21.6 | 62.5 | 45.0 | 33.0 | 50.4 | 39.3 | 24.2 | 61.8 |
| Comparative example | 58.8 | 51.6 | 67.7 | 29.1 | 19.8 | 44.4 | 39.1 | 30.9 | 52.9 |

Tables 1 and 2 show the results of a peel measurement and a shear measurement of the examples.

In order to prepare the samples, a strip of the nonwoven material is cropped in a transverse direction relative to the production process depicted in FIGS. 2 and 3 with a width of one inch (24.4 mm). In order to obtain a defined connection with the hooks, the sample is then hung in a hanging device. Then, a hook strip having a mass of 500 g is pressed by hand against the nonwoven material for a duration of 3 seconds and then hangs on the nonwoven material 1 under a weight load for 5 seconds before the weight is removed.

The further testing is then carried out with the standard settings of a Zwick device. To do so, the nonwoven material 1 is inserted into the lower clamping jaw and the hook strip is inserted into the upper clamping jaw. In the shear measurement, the hook strip and the nonwoven material 1 are disposed flat in a plane. In a peel measurement, the nonwoven material 1 is clamped such that, proceeding from the hook strip, the material is folded onto itself by 180°. In the tensile test, a peel-off by 180° is simulated.

In a variation of the test parameters, it is shown that the specific properties are determined in the same manner in the relative comparison of the various materials with one another. The specific test method that is selected is therefore merely an example and is used for the purpose of explanation.

The measurements show that the peel and shear values of a known texturized polyamide knitted fabric are met or even exceeded with various masses per unit area of the nonwoven material 1 according to the invention. The closure element according to the invention is characterized by a very soft, uniform and visually appealing surface.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A loop-forming closure element for hook-and-loop fasteners comprising an embossed nonwoven material layer that comprises, continuous fibers of a spun bonded fabric and carded staple fibers;

wherein the continuous fibers and carded staple fibers are intertwined, where the intertwined continuous fibers and carded staple fibers together embody the embossed nonwoven material layer as a fiber blend;

wherein a proportion of the continuous fibers to a proportion of carded staple fibers changes across a thickness of the embossed nonwoven material layer; and wherein the carded staple fibers protrude from at least one side of the embossed nonwoven material layer.

2. The closure element according to claim 1, wherein the embossed nonwoven material layer is formed entirely of the continuous fibers and the carded staple fibers.

3. The closure element according to claim 1, wherein the embossed nonwoven material layer is cold embossed without the continuous fibers fusing with the carded staple fibers.

4. The closure element according to claim 1, wherein the embossed nonwoven material layer has a mass per unit area between 20 g/m² and 50 g/m².

5. The closure element according to claim 1, wherein the embossed nonwoven material layer is laminated with a carrier film.

6. The closure element according to claim 5, wherein the embossed nonwoven material layer and the carrier film are laminated with an adhesive applied in a pattern.

7. The closure element according to claim 1, wherein the embossed nonwoven material layer comprises linear or wavy impressions.

8. The closure element according to claim 1, wherein the continuous fibers are formed of polyolefin, in particular polypropylene.

9. The closure element according to claim 1, wherein the staple fibers are formed of a polyolefin or a polyester.

10. The closure element according to claim 1, the carded staple fibers protrude from both sides of the embossed nonwoven material layer.

* * * * *